No. 682,953. Patented Sept. 17, 1901.
D. E. NORTON.
BICYCLE, TRICYCLE, &c.
(Application filed July 6, 1900.)
(No Model.) 2 Sheets—Sheet 2.
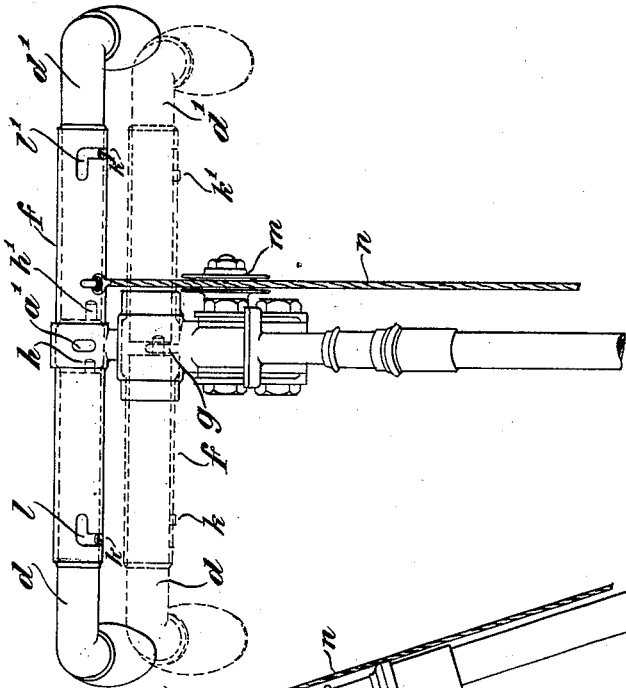
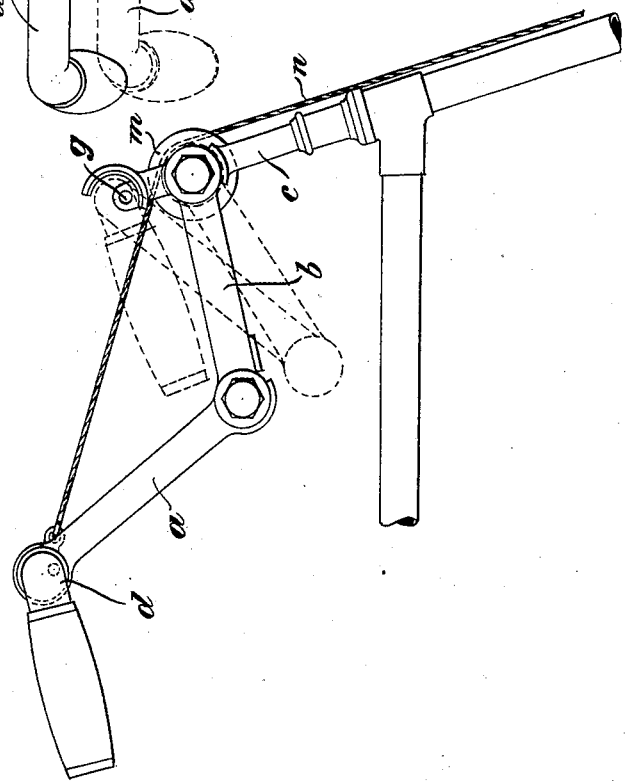
Witnesses.
Arthur Woodman.
Samuel L. Glenn.
Inventor
Downes Elland Norton.
per John A. O'Donnell
Attorney.

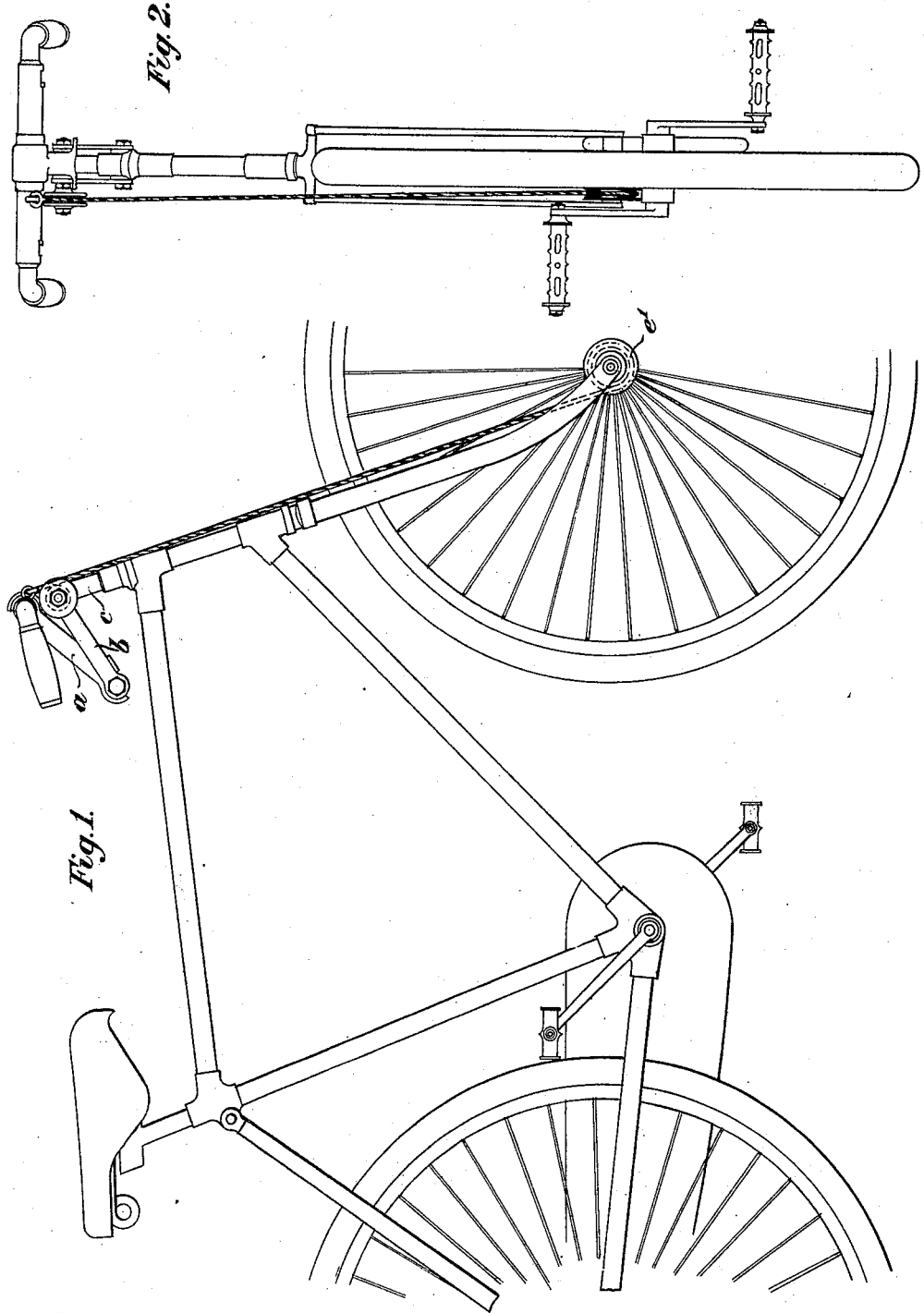

UNITED STATES PATENT OFFICE.

DOWNES ELLAND NORTON, OF HAMPTON HILL, ENGLAND.

BICYCLE, TRICYCLE, &c.

SPECIFICATION forming part of Letters Patent No. 682,953, dated September 17, 1901.

Application filed July 6, 1900. Serial No. 22,755. (No model.)

*To all whom it may concern:*

Be it known that I, DOWNES ELLAND NORTON, a subject of the Queen of Great Britain and Ireland, residing at Laurel Dene, Hampton Hill, in the county of Middlesex, England, have invented new and useful Improvements in and Relating to Bicycles, Tricycles, and the Like, of which the following is a specification.

My invention relates to improved means for assisting in driving and increasing the speed of bicycles, tricycles, and the like by using the hands for driving in addition to the ordinary driving by the feet of the rider.

The way in which I carry out my invention is as follows, reference being had to the accompanying drawings, in which—

Figure 1 is a part side view of a bicycle comprising my invention. Fig. 2 is a front view of Fig. 1. Fig. 3 is a part side view of a bicycle, showing the handle-bar in the normal position in dotted lines and in full lines in a position of part of the movement for driving the machine, as hereinafter described. Fig. 4 is a front view of Fig. 3.

Instead of providing the handle-bar on the ordinary handle-bar pillar in the head of the front fork or steering-head of the machine I attach it to a separate pillar $a$, pivoted to the rear end of a link $b$, connected (preferably by a pivotal joint) to the front fork or steering-head $c$ of the machine. On the handle-bar $d$ itself, or, as shown, on a connection $e$ thereon, I mount a spring drum or pulley $e'$, such as that described in my prior specification of British Letters Patent, No. 259,355, dated September 1, 1896. Normally the handle-bar $d$ rests on the top of the front pillar or steering-head $c$ in the same position as the ordinary handle-bars on bicycles not provided with hand driving mechanism and is preferably locked in this position in the following manner, referring to Figs. 3 and 4: The handle-bar is divided transversely in the center—that is to say, it is formed of two separable parts $d\ d'$, which are mounted so as to be capable of sliding in a sleeve or socket $f$ on the top of the handle-bar pillar $a$, which is provided with a slot or hole $a'$, adapted to engage a bored lug or eyelet $g$ on top of the front fork or steering-head $c$ when in the normal position of rest. A pin or projection $h$ on the end of one part of the handle-bar passes through the lug $g$ (and enters a corresponding recess $h'$ in the end of the other part of said handle-bar, thus locking the two parts $d\ d'$ of the handle-bar together) and locking the handle-bar to the front fork or steering-head $c$. Pins $k\ k'$ on the parts $d$ and $d'$, respectively, of said handle-bar engage in slots $l\ l'$ in the sleeve $f$ and prevent lateral movement of the parts $d\ d'$ when in the position shown in Figs. 3 and 4—that is, when driving the machine by hand-power. $m$ is a guide-pulley, carried by a bracket $m'$ on the steering-head $c$, for a flexible connection $n$, the lower end of which is attached to a V-shaped clip or hook $n'$, which engages or hooks onto the pedal $o$ (see Figs. 1 and 2) or to the driving-crank $o'$ of the machine.

The working is as follows: Assuming the handle-bar $d\ d'$ to be locked in the normal position on top of the front fork or steering-head $c$, (in which position the machine can be driven by the feet alone in the ordinary way,) the pins $k\ k'$, Fig. 2, will be in the horizontal parts of the slots $l\ l'$ in sleeve $f$. When it is desired to drive the machine by hand, the parts $d\ d'$ of the handle-bar are moved laterally, (in opposite directions,) so as to withdraw the pin or bolt $h$ from the lug $g$ on the steering-head $c$ and into the lateral or vertical part of the slot, thereby allowing the rider to give a reciprocating or to-and-fro movement to the handle-bar, which through the flexible connection $n$, attached to the spring drum or pulley $e'$ on said handle-bar and to the V-shaped hook $n'$ on the driving-pedal $o$ or on the crank $o'$, enables him to drive the machine by manual power alone or to assist the driving by the feet, the pull on the connection $n$ being of course given at the commencement of and during the upward and forward movement of the crank $o'$ in the driving direction. In the upward movement of the crank the spring drum or pulley $e'$ takes up the slack of the connection $n$ when not pulled by the hands.

Although I have described a particular method of locking the handle-bar in the normal position on the steering-head or front pillar $c$, yet I do not confine myself to this arrangement, as it is obvious the handle-bar can be held thereon in any other convenient manner and that it need not be formed of two parts, as hereinbefore described.

What I claim as my invention, and desire to secure by Letters Patent, is—

The combination, with a front fork, of a link $b$ pivoted at one end to the said fork, a link $a$ pivoted to the other end of the link $b$ and foldable upon it, a reciprocatory handle-bar provided with a projecting arm $e$ and journaled in the free end portion of the link $a$, a spring-drum carried by the said arm, and a flexible connection wound upon the said drum and connected with the driving mechanism, substantially as set forth.

In testimony whereof I have signed my name to this specification in the presence of two subscribing witnesses.

DOWNES ELLAND NORTON.

Witnesses:
 W. A. LEWES,
 J. GROOM.